(12) United States Patent
Pandey

(10) Patent No.: US 8,832,733 B2
(45) Date of Patent: Sep. 9, 2014

(54) METHOD AND SYSTEM FOR PROVIDING LOCALIZED ADVERTISEMENT INFORMATION USING A SET TOP BOX

(75) Inventor: Siddharth Pandey, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 507 days.

(21) Appl. No.: 12/337,359

(22) Filed: Dec. 17, 2008

(65) Prior Publication Data

US 2010/0153991 A1    Jun. 17, 2010

(51) Int. Cl.
| | | |
|---|---|---|
| *H04N 7/10* | (2006.01) | |
| *H04N 7/025* | (2006.01) | |
| *H04N 21/478* | (2011.01) | |
| *G06Q 30/02* | (2012.01) | |
| *H04N 21/81* | (2011.01) | |
| *H04N 21/266* | (2011.01) | |
| *H04N 7/16* | (2011.01) | |
| *H04N 21/45* | (2011.01) | |
| *H04N 21/658* | (2011.01) | |

(52) U.S. Cl.
CPC ......... *H04N 7/163* (2013.01); *H04N 21/47815* (2013.01); *G06Q 30/02* (2013.01); *H04N 21/812* (2013.01); *H04N 21/26603* (2013.01); *H04N 21/4524* (2013.01); *H04N 21/6581* (2013.01)
USPC .............. 725/34; 725/36; 725/42; 725/46; 705/14.25; 705/14.4; 705/14.49; 705/14.53; 705/14.58; 705/14.67

(58) Field of Classification Search
USPC ............... 725/32–36; 705/14.25, 14.4, 705/14.53–14.55, 14.58, 14.66, 14.67
See application file for complete search history.

(56) References Cited

U.S. PATENT DOCUMENTS

| | | | | |
|---|---|---|---|---|
| 7,260,823 | B2 * | 8/2007 | Schlack et al. | 725/9 |
| 7,856,645 | B2 * | 12/2010 | Pharn | 725/34 |
| 8,046,798 | B1 * | 10/2011 | Schlack et al. | 725/46 |
| 2003/0149975 | A1 * | 8/2003 | Eldering et al. | 725/34 |
| 2004/0045030 | A1 * | 3/2004 | Reynolds et al. | 725/110 |
| 2004/0261100 | A1 * | 12/2004 | Huber et al. | 725/32 |
| 2007/0061837 | A1 * | 3/2007 | Dadush | 725/34 |
| 2007/0219859 | A1 * | 9/2007 | Huntington | 705/14 |
| 2007/0230480 | A1 * | 10/2007 | Ikeda et al. | 370/395.52 |
| 2007/0294721 | A1 * | 12/2007 | Haeuser et al. | 725/34 |
| 2008/0063381 | A1 * | 3/2008 | Conroy et al. | 386/124 |
| 2008/0250453 | A1 * | 10/2008 | Smith et al. | 725/39 |
| 2009/0076882 | A1 * | 3/2009 | Mei et al. | 705/10 |
| 2009/0094093 | A1 * | 4/2009 | Phan | 705/10 |
| 2009/0217324 | A1 * | 8/2009 | Massimi | 725/46 |
| 2009/0249400 | A1 * | 10/2009 | Carlberg et al. | 725/44 |
| 2010/0312646 | A1 * | 12/2010 | Gupta et al. | 705/14.58 |

* cited by examiner

*Primary Examiner* — Nnenna Ekpo

(57) ABSTRACT

A system and method in accordance with exemplary embodiments may receive, at a server, user profile data associated with one or more set top boxes via a network. The system and method may then search for and select local advertisement content based on at least the user profile data. Further, the system and method may transmit, to the one or more set top boxes, the selected local advertisement content.

13 Claims, 6 Drawing Sheets

METHOD AND SYSTEM FOR PROVIDING LOCALIZED ADVERTISEMENT INFORMATION USING A SET TOP BOX

BACKGROUND INFORMATION

In many instances, local advertisements offering one or more products, services, and/or coupons associated with a particular region and/or location (e.g., the Washington D.C. area, the Northern California area) may be provided to consumers in local forms of media, such as a local classifieds paper. In such instances, consumers that are interested in receiving and/or reviewing these local advertisements may obtain a copy of the local classifieds paper. Some consumers, however, may consider the current methods of receiving and/or reviewing local advertisements overly cumbersome and archaic. With recent developments in the television technologies, television service providers may desire to provide their consumers with seamless ways to perform daily tasks.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

The description below describes servers and network elements that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

The description below also describes physical and logical elements of a system, some of which are explicitly shown in figures, others that are not. The inclusion of some physical elements of a system may help illustrate how a given system may be modeled. It should be noted, however, that all illustrations are purely exemplary and that the local advertisement system described herein may be performed on different varieties of systems which may include different physical and logical elements.

Figure 1:
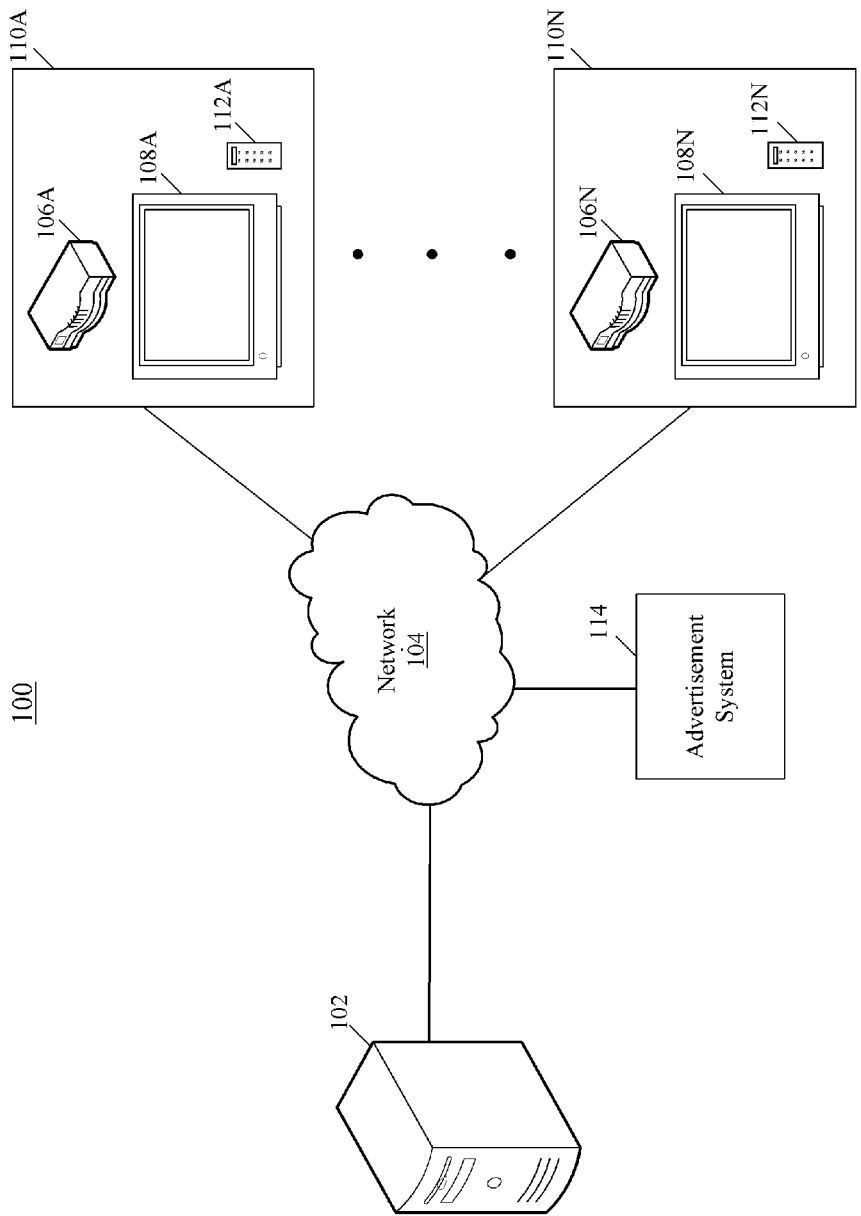
FIG. 1 illustrates a block diagram of a local advertisement system in accordance with exemplary embodiments.

For instance, local advertisement system 100 in FIG. 1 illustrates a simplified view of a system and various elements in the system. It is noted that other hardware and software not depicted may be included in the local advertisement system 100. It is also noted that the local advertisement system 100 illustrates a specific number of instances of a server 102, a network 104, a set top box 106, a display device 108, a user premise 110, an input device 112, and an advertiser system 114. It will be appreciated that a single instance and/or multiple instances of these entities may be included in a local advertisement system 100.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers and network elements, etc.) separately. The functions described as being performed at various components may be performed at other components, and the various components may be combined and/or separated. Other modifications also may be made.

In an exemplary embodiment, a local advertisement system may be configured to output (e.g., display) local advertisement content to a user based on a local viewing area of the user using a display device (e.g., a television) that is communicatively coupled to a set top box. A local viewing area of a user may include a region and/or location that is associated with particular local television broadcasts. Local advertisement content may include advertisement data associated with one or more products, one or more services, one or more coupons, etc., of a particular region/location that is associated with the local viewing area of the user. If, for example, the local viewing area of a user includes the Northern California region, local advertisement content may include an advertisement that indicates that a treadmill is for sale by a seller (e.g., seller X) located in Oakland, Calif. If, in another example, the local viewing area of a user includes the Washington D.C. region, local advertisement content may include an advertisement that indicates that legal services are being offered by a company (e.g., Law Firm Y) located in Northwest Washington, D.C. If, in yet another example, the local viewing area of a user includes the New York City region, local advertisement content may include a coupon for $10.00 off of a ticket to a theatre play (e.g., the Lion King) in the Theatre District of Manhattan.

In an exemplary embodiment, the local advertisement system may be configured to output (e.g., display) local advertisement content in response to receiving one or more local advertisement request messages from a set top box associated with a user. A local advertisement request message may include location information that indicates the local viewing area of a user and/or user interest information that indicates one or more interests of a user. It should be noted that the local advertisement system may be configured to use the approximate location of the set top box from which the local advertisement request message was transmitted to determine the local viewing area of a user operating the set top box. In various embodiments, a user may initiate one or more local advertisement request messages using an input device (e.g., a remote control) configured to communicate with the set top box.

In an exemplary embodiment, the local advertisement system may be configured to periodically output (e.g., display) local advertisement content in response to receiving user profile data from a set top box associated with a user. User profile data may include user interest information, location information, output information, and/or any other information that may be used to search for and/or output local advertisement content to the user. Output information may include data that indicates one or more user preferences of one or more methods of output (e.g., display). For example, output information may indicate that a user prefers to receive updated local advertisement content every Saturday at 12:00 pm using a local advertisement graphical user interface associated with the local advertisement system (discussed in further detail below). In another example, output information may indicate that a user prefers to continuously receive local advertisement content in the form of non-linear content displayed with linear content.

In various embodiments, content may refer to multimedia that uses, for example, one or more of text, audio, graphics, video, and/or combinations thereof. Linear content may include content that is displayable in a predefined sequence, which is determined before a broadcast time of the content. In various embodiments, linear content may include a television program, a movie, a Video On Demand (VOD) program, and/or any other program that is displayed on a television. For example, linear content may include a television program, such as an episode of "Law and Order." In another example, linear content may include a Video On Demand (VOD) movie, such as "Titanic." In yet another example, linear content may include a television program associated with a premium channel (e.g., HBO, ShowTime, Cinemax), such as an episode of "The Tudors."

Non-linear content may include interactive local advertisement content, which is displayed in conjunction with linear content, that allows a user to interact with and/or access the content during or after a display of the linear content. In various embodiments, non-linear content may include local advertisement content in audio form, local advertisement content in video form, local advertisement content music, local advertisement content photos, local advertisement content banners, local advertisement content web-pages, local advertisement content icons, etc. For example, non-linear content may include an interactive local advertisement content banner that advertises the sale of a treadmill that is accessible within the local viewing area of a user that is to be displayed in conjunction with linear content (e.g., an episode of "Law and Order"). In another example, non-linear content may include an interactive local advertisement content icon that advertises legal services that are accessible within the local viewing area of a user that is to be displayed in conjunction with linear content (e.g., an episode of "The Tudors").

In an exemplary embodiment, the local advertisement system may be configured to receive advertisement content from one or more advertisement systems (e.g., one or more third party systems) communicatively coupled to the local advertisement system. In various embodiments, advertisement content may include advertisement data associated with one or more products, one or more services, one or more coupons, etc. In various embodiments, advertisement content may include product location information. Product location information may include data that indicates the region/location in which one or more products, one or more services, one or more coupons, etc., are located and/or may be accessed by a user.

FIG. 1 illustrates a block diagram of a local advertisement system 100 in accordance with exemplary embodiments. In exemplary embodiments, the local advertisement system 100 may include a server 102 communicatively coupled to a network 104, one or more set top boxes 106 at one or more customer premises 110 communicatively coupled to the network 104, and one or more advertisement systems 114 communicatively coupled to the network 104. The network 104 may communicate one or more advertisement content signals from the one or more advertisement systems to the server 102. The advertisement content signals may include advertisement data from one or more advertisers. The network 104 may communicate one or more local advertisement request messages (e.g., signals) and/or one or more user profile data signals from the one or more set top boxes 106 to the server 102. The user profile data signals may include user profile data associated with one or more users. Based on the user interest information and/or the location information of the one or more local advertisement request messages and/or the one or more user profile data signals, the network 104 may communicate one or more local advertisement content signals and/or one or more linear content signals from the server 102 to the one or more set top boxes 106.

The network 104 may be a wired network, a wireless network, and/or combinations thereof. The network 104 may transport the advertisement content signals and/or various messages in analog form and/or in digital form from the one or more advertisement systems 114 to the server 102. The network 104 may transport the local advertisement content signals, the linear content signals, and/or various messages in analog form and/or digital form from the server 102 to the set top box 106. The network 104 may transport the local advertisement request messages, the user profile data signals, and/or various messages in analog form and/or digital form from the set top box 106 to the server 102. In an exemplary embodiment, at least a portion of the network 104 may comply with the Telecommunication Union Telecommunication Standard (ITU-T) Recommendation G.983.1 titled "Broadband Optical Access Systems based on Passive Optical Networks (PON)," January 2005, the contents of which are incorporated herein by reference in its entirety. The network 104 also may comply with other standards. In an exemplary embodiment, the network 104 may communicate with the set top box 106 using three separate wavelengths, where one of the wavelengths may exchange data using a data communication session, such as, but not limited to, Internet Protocol, another wavelength may communicate local advertisement content signals and/or linear content signals to the set top box 106, and the last wavelength may receive messages from the set top box 106. The network 104 also may be a cable television network, a satellite network, fiber optic network, combinations thereof, or other networks capable of distributing local advertisement content signals and/or linear content signals from the server 102 to the set top box 106, and exchanging information (e.g., messages, requests) between the server 102 and the set top box 106 via the network 104.

The local advertisement content signals (non-linear content signals) may be, for example, video signals and/or audio signals that may be in digital or analog form, data, other digital information and/or analog information, and/or combinations thereof. The local advertisement content signals may be used to display local advertisement content at the display device 108. Local advertisement content may include video, audio, text, or other types of visually or audibly displayable information.

The linear content signals may be, for example, video signals and/or audio signals that may be in digital or analog form, data, other digital information and/or analog information, and/or combinations thereof. The linear content signals may be used to display linear content at the display device 108. Linear content may include video, audio, text, or other types of visually or audibly displayable information.

The customer premises 110A-N may each include a set top box 106 and a display device 108. FIG. 1 illustrates a set top box 106A, a display device 108A, and an input device 112A at customer premises 110A, and a set top box 106N, a display device 108N, and an input device 112N at customer premises 110N. It is also noted that a single customer premise 110 may include multiple set top boxes 106, multiple display devices 108, and/or multiple input devices 112. The set top box 106 also may be remotely located from the display device 108.

In an exemplary embodiment, the set top box 106 may be a hardware device that may receive a local advertisement content signal and/or a linear content signal from the network 104 and may cause display of the local advertisement content signal and/or the linear content signal at the display device 108. For example, the set top box 106 may cause display of the local advertisement content signal and/or the linear content signal at a display device 108, such as a television set.

In an exemplary embodiment, the set top box 106 may be a computer (e.g. a laptop) and the display device 108 may be a computer monitor. It is noted that the set top box 106 and the display device 108 are depicted and described as being separate devices in FIG. 1. The set top box 106 and the display device 108, however, may be combined into a single unit. The functions performed by the set top box 106 and the display device 108 also may be implemented in a mobile phone, a wireless device, or any other device that may communicate via the network 104.

In an exemplary embodiment, the advertisement system 114 may include, but is not limited to, a computer device or communications device including, e.g., a personal computer (PC), a workstation, a mobile device, a handheld PC, a personal digital assistant (PDA), a thin system, a fat system, network appliance, an Internet browser, an interactive television, a server, and/or any other device that is configured to create, initiate, and/or transmit advertisement content signals to the server 102 using the network 104. The set top box 106 and the server 102 are discussed in further detail below.

Figure 2:
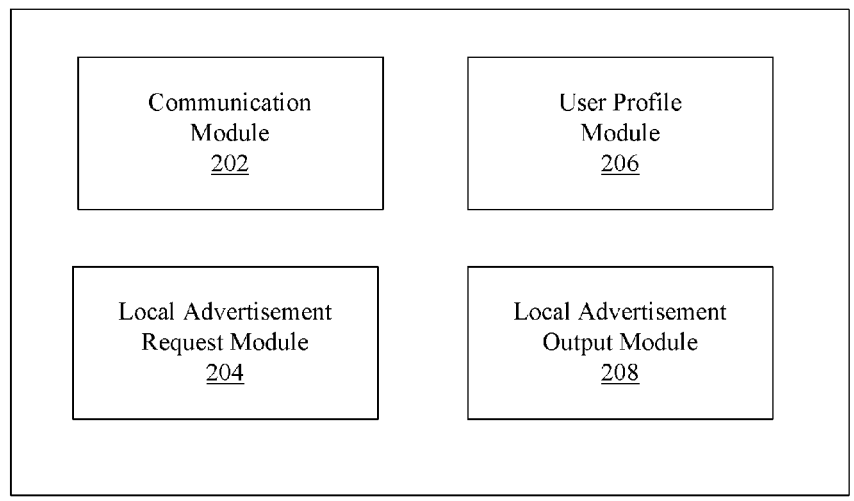
FIG. 2 illustrates exemplary modules of a set top box of a local advertisement system in accordance with exemplary embodiments.

FIG. 2 illustrates exemplary modules of a set top box 106 of a local advertisement system 100 in accordance with exemplary embodiments. In an exemplary embodiment, the set top box 106 may include a communication module 202, a local advertisement request module 204, a user profile module 206, and a local advertisement content output module 208. It is noted that the modules 202, 204, 206, and 208 are exemplary. The functions of the modules 202, 204, 206, and 208 may be performed by other modules remote or local to the set top box 106, and the modules 202, 204, 206, and 208 may be combined and/or separated.

The communication module 202 may include software and/or hardware configured to provide communication between the set top box 106 and the network 104. In various embodiments, the communication module 202 may be configured to transmit local advertisement content signals, linear content signals, and/or one or more messages received from the network 104 to the other modules 204, 206, and 208, and may communicate messages received from the modules 204, 206, and 208 to the network 104. In various embodiments, the communication module 202 may be configured to receive one or more user request messages and/or one or more user selection messages from a user using the input device 112 (e.g., a remote control).

The local advertisement request module 204 may include software and/or hardware configured to receive one or more user request messages to display local advertisement information from an input device 112. For example, a user may initiate one or more user request messages using an input device 112 (e.g., a remote control). In various embodiments, local advertisement information may be associated with one or more local advertisement graphical user interfaces. In response to receiving the one or more user request messages to display local advertisement information, the local advertisement system 100 and/or the local advertisement output module 208 may output a graphical user interface (e.g., the local advertisement graphical user interface illustrated in FIG. 4) to a display device 108.

The local advertisement request module 204 may include software and/or hardware configured to receive one or more user selection messages from an input device 112. In various embodiments, the local advertisement request module 204 may receive one or more user selection messages that indicate a user's selection of (e.g., request for) local advertisement content associated with one or more user interests to be requested from the server 102. For example, the local advertisement request module 204 may receive one or more user selection messages that indicate a user's request for local advertisement content associated with one user interest, such as "Used Vehicles." In another example, the local advertisement request module 204 may receive one or more user selection messages that indicate a user's request for local advertisement content associated with another user interest, such as "Tickets." In yet another example, the local advertisement request module 204 may receive one or more user selection messages that indicate a user's request for local advertisement content associated with yet another user interest, such as "Furniture."

The local advertisement request module 204 may include software and/or hardware configured to formulate and/or create one or more local advertisement request messages. In various embodiments, the local advertisement request module 204 may be configured to formulate and/or create one or more local advertisement request messages based on the one or more user selection messages. In various embodiments, local advertisement request messages may include location information, user interest information, user identification information, and/or any other information that may be used to request relevant local advertisement content. In various embodiments, user identification information may include a user identification number and/or password made of a sequence of symbols and/or numbers that is associated with a particular user of a particular household. For example, the local advertisement request module 204 may formulate and/or create one or more local advertisement request messages using a first user identification (e.g., "ABC123") associated with a first user (e.g., John Doe) of a first household (e.g., household X). In another example, the local advertisement request module 204 may formulate and/or create one or more local advertisement request messages using a second user identification (e.g., "999AAA") associated with a second user (e.g., Jane Doe) of the first household (e.g., household X). In yet another example, the local advertisement request module 204 may formulate and/or create one or more local advertisement request messages using a third user identification (e.g., "CAC789") associated with a third user (e.g., Frank Doe) of the first household (e.g., household X). Accordingly, each user of a household may request local advertisement content based on individual interests. In various embodiments, the local advertisement system 100 may be configured to process one or more requests for local advertisement content based on a user identification number, a user, and/or a household identifier. For example, the local advertisement system 100 may only use a user identification number to process a request for local advertisement content.

Figure 4:
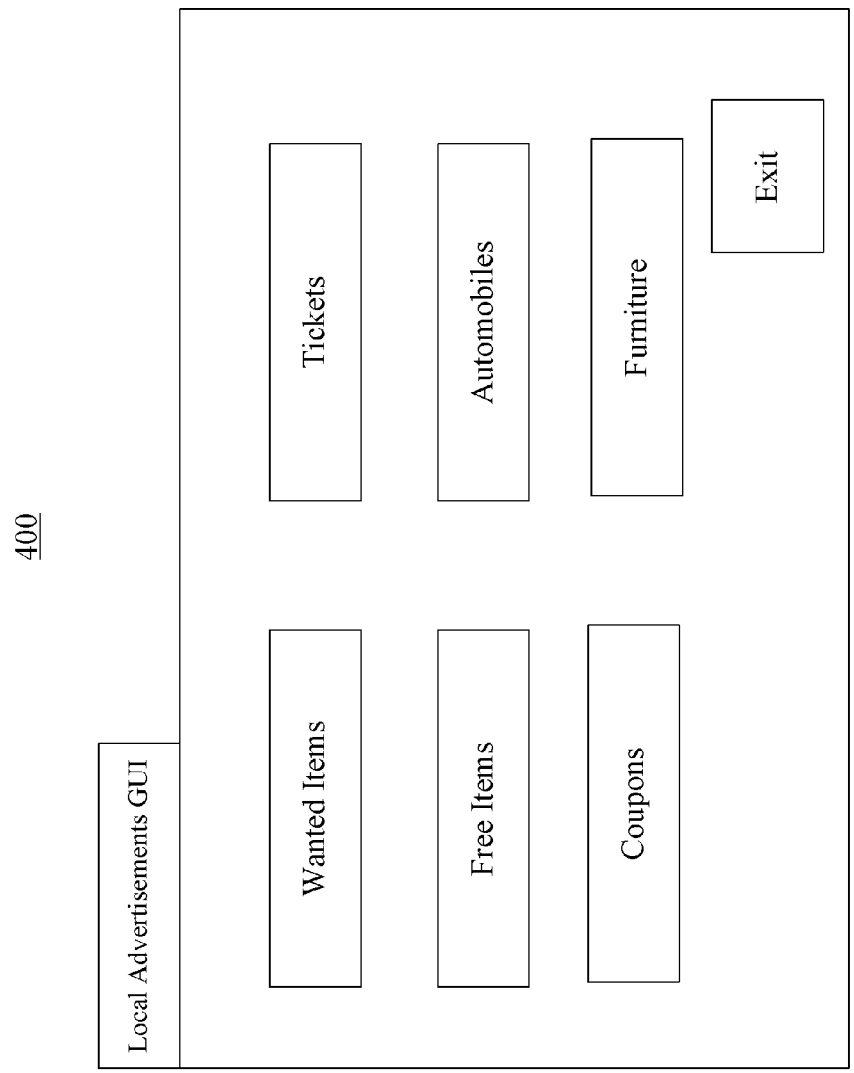
FIG. 4 illustrates an exemplary screen display of a local advertisement menu options graphical user interface in accordance with exemplary embodiments.

In response to receiving local advertisement content based on the one or more local advertisement request messages, the set top box 106, local advertisement system 100, and/or local advertisement output module 208 may output the local advertisement content to a display device 108 using a graphical user interface (e.g., the local advertisements graphical user interface illustrated in FIG. 4). In various embodiments, one or more graphical user interfaces may display the local advertisement content according to one or more subject areas, one or more levels of interest, amount of time since the indication of an interest, etc.

The user profile module 206 may include software and/or hardware configured to collect, determine, create, and/or modify user profile data based on a user's viewing habits and/or a user's preferences. In various embodiments, user profile data may include user identification information that is associated with a particular user of a particular household. Accordingly, user profile data associated with each user of a household may be collected based on individual interests.

In various embodiments, collecting user profile data (or user preferences/interests) may include a user voluntarily inputting preferences/interests into the user profile module 206 of the local advertisement system 100. For example, the local advertisement system 100, through the set top box 106, may provide an interactive preference screen (e.g., a preference graphical user interface) for the user after one or more television programs. In the interactive preference screen, the user may be asked to provide feedback about a particular television program. In various embodiments, the feedback may include a rating, a comment, or other similar feedback, to indicate the user's preference for the particular television program. The user's voluntary input may generate an explicit rating to be weighted in a calculation of the user's preferences. In various embodiments, the interactive preference screen may be accessed without having watched a television program. The user may input preferences about any previously-watched television program and/or any personal preferences.

In various embodiments, feedback entry may be accomplished via an input device 112. Once the set top box 106 receives the remote control entries corresponding to the user's preferences, the user profile data may be stored at the set top box 106 or transmitted to the server 102 for storage and processing. Although the interactive preference screen for feedback entry may be complex (so as to retrieve as much voluntary user input as possible), a simpler interactive screen may be much more efficient and more attractive to users. For example, a simple interactive screen may request the user to input basic user preference information, such as an amount of interest in a television program, an amount of interest in viewing similar television programs, an amount of interest in one or more genres of television programs, etc.

In various embodiments, collecting user profile data may include a user inputting feedback using a computer device, filling out a hard-copy of a questionnaire, mailing a hard-copy of a questionnaire, speaking to a representative using a telephone, and/or performing any other act to provide the local advertisement system 100 with feedback information.

Because a user may find it cumbersome to voluntarily enter feedback, the local advertisement system 100, for example, may utilize a knowledge discovery feature to retrieve a user's preferences by studying the user's viewing habits. The knowledge discovery feature may begin at the input device 112 where the user inputs various commands reflective of personal viewing preferences/habits. The user profile module 206 may log these commands as "raw" data for processing the various actions the user is performing. For example, the user profile module 206 may receive a command from the input device 112 to change a channel and/or television program to another. The user profile module 206 may log the change, the date and time the instructions were received and/or performed, the length and duration of the change, the name of the television program change to and from, the type of television program, whether any other options and/or commands were also received, and other information relating to a user's preferences and habits. This "raw" data may then be transmitted to the server 102 as user profile data for further storage and/or processing. As a result, the knowledge processed may be used to search for and/or identify relevant local advertisement content.

In various embodiments, the local advertisement system 100 may determine a user's viewing habits and/or preferences using a knowledge discovery feature to retrieve a user's preferences by studying the user's viewing habits related to various advertisements. For example, local advertisement system 100 may access an advertising log(not shown) to determine the user's viewing habits and/or preferences. An advertising log may include advertisement data associated with the amount of advertisements a user has watched, the type of advertisements the user watches, the amount of time a user changes the channel from one or more advertisements, the amount of time a user watches an advertisement to completion, and/or any other advertisement data associated with identifying user preferences from the user's viewing habits related to advertisements. As a result, the knowledge processed may be used to search for and/or identify relevant local advertisement content.

It should be appreciated that while these user profile data obtaining techniques discussed above generally relate to the set top box 106 and/or the server 102, one of ordinary skill in the art would recognize that other servers (not shown) of the local advertisement system 100 may be involved in generating user profile data as well.

It should also be appreciated that the knowledge discovery technique may initially request permission from users to retrieve, store, and process the user's viewing habits to generate user profile data and ultimately provide relevant local advertisement content. This may be accomplished with a disclaimer or other similar methods and/or techniques. The user profile module 206 may include software and/or hardware configured to transmit user profile data via the communication module 202 and/or the network 104.

In response to receiving local advertisement content based on the user profile data, the set top box 106, local advertisement system 100, and/or local advertisement output module 208 may output the local advertisement content to a display device 108 based on the output information associated with the user profile data. For example, the set top box 106 may output local advertisement content based on output information that indicates that a user prefers to receive updated local advertisement content every Saturday at 12:00 pm using a graphical user interface (e.g., the local advertisement graphical user interface illustrated in FIG. 4). In another example, the set top box 106 may output local advertisement content based on output information that indicates that a user prefers to continuously receive local advertisement content in the form of non-linear content displayed with linear content. For example, based on the output information, the local advertisement output module 208 may output (e.g., display) local advertisement content in the form of an interactive local advertisement content banner (non-linear content) that advertises the sale of a treadmill that is accessible within the local viewing area of a user in conjunction with linear content (e.g., a local broadcast of a football game).

The local advertisement output module 208 may include software and/or hardware configured to control the output (e.g., display) of the local advertisement content signal, the local advertisement information (e.g., one or more local advertisement menu options), various graphical user interfaces, and/or linear content at the display device 108. In various embodiments, to cause display of the local advertisement content signal, the local advertisement output module 208 may receive instructions from the input device 112, may activate one or more particular local advertisement output options based on the received instructions, may cause the display of the local advertisement content signal at the display device 108 based on the one or more particular local advertisement output options activated, and/or may cause the display of the local advertisement content signal at the display device 108 based on the output information.

Figure 3:
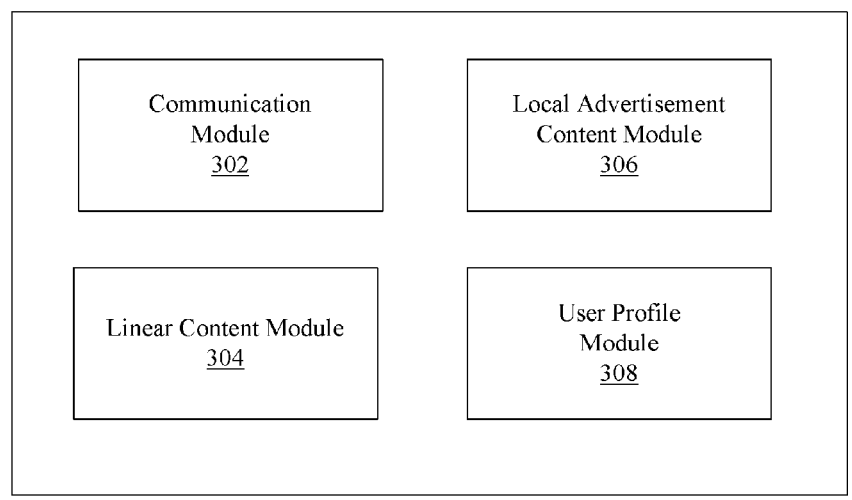
FIG. 3 illustrates exemplary modules of a server of a local advertisement system in accordance with exemplary embodiments.

FIG. 3 illustrates exemplary modules of a server 102 of a local advertisement system 100 in accordance with exemplary embodiments. In an exemplary embodiment, the server 102 may include a communication module 302, a linear content module 304, a local advertisement content module 306, and a user profile module 308. It is noted that the modules 302, 304, 306, and 308 are exemplary. The functions of the 302, 304, 306, and 308 may be performed by other modules remote or local to the server 102, and the modules 302, 304, 306, and 308 may be combined and/or separated.

The communication module 302 may include software and/or hardware configured to provide communication between the server 102 and the network 104. In various embodiments, the communication module 302 may be configured to receive one or more local advertisement request messages from one or more set top boxes 106 via the network 104. In various embodiments, the communication module 302 may be configured to receive one or more user profile data signals from one or more set top boxes 106 via the network 104. In various embodiments, the communication module 302 may be configured to receive one or more advertisement data signals from one or more advertisement systems 114 via the network 104. In various embodiments, the communication module 302 may be configured to transmit one or more local advertisement content signals and/or one or more linear content signals to one or more set top boxes 106 in response to the receipt of one or more local advertisement request messages and/or one or more user profile data signals via the network 104. In various embodiments, the communication module 302 may be configured to transmit signals and/or messages received from the network 104 to other modules (e.g., 304, 306, 308) and may communicate signals and/or messages received from other modules (e.g., 304, 306, 308) to the network 104.

The linear content module 304 may include software and/or hardware configured to receive and/or transmit linear content. In various embodiments, the linear content module 304 may be configured to transmit linear content to one or more set top boxes via the network 104.

The user profile module 308 may include software and/or hardware configured to receive, store, and/or process user profile data to determine relevant local advertisement content. Based on the received user profile data, the user profile module 308 may determine that a user prefers to watch particular television programs on a particular channel. This information may then be processed and stored as one or more user interests (or user preferences) at the server 102. For example, the processing logic of the user profile module 308 may process the "raw" user profile data received (e.g., how long the user stays at particular channel without changing) and determine the user's interests regarding local advertisement content. In this example, the user profile module 308 may process the actions performed by the user and to determine user interests. These actions may include, but are not limited to, television programs and/or television channels watched, advertisements watched, television programs recorded, favorites added or tagged, movies purchased, reminders set, queries searched, series recording priority, consistency in viewing various television programs and/or channels, duration of viewing, frequency of channel-changing from or to various television programs and/or television channels, types of television channels and/or television programs viewed, etc.

The local advertisement content module 306 may include software and/or hardware configured to receive, process, and/or store advertisement data from one or more advertisement systems 114. In various embodiments, the local advertisement content module 306 may be configured to store the advertisement data according to product location information and/or subject area associated with the advertisement data. For example, the local advertisement content module 306 may store advertisement data associated with the Northern California area together. In another example, the local advertisement content module 306 may store advertisement data associated with the "Used Vehicles" subject area together. In yet another example, the local advertisement content module 306 may store advertisement data associated with the Northern California area and the "User Vehicles" subject area together.

The local advertisement content module 306 may include software and/or hardware configured to search for and/or retrieve local advertisement content based on user profile data and/or one or more local advertisement request messages. In various embodiments, retrieving local advertisement content may include comparing the location information associated with the user profile data and/or one or more local advertisement request messages with the product location information associated with the advertisement data. If, for example, the local advertisement content module 306 determines that the product location information of the advertisement data sufficiently matches the location information (e.g., within the local viewing area of the user based on zip code, township, city, county, region, state, etc.), the server 102 may transmit the advertisement data as local advertisement content to the set top box 106. If, however, the local advertisement content module 306 determines that the product location information of the advertisement data does not sufficiently match the location information, the local advertisement content module 306 may continue to search for local advertisement content.

In various embodiments, retrieving local advertisement content may include comparing one or more user's interests associated with the user profile data and/or one or more local advertisement request messages with one or more subject areas associated with the advertisement data. If, for example, the local advertisement content module 306 determines that one or more subject areas of the advertisement data sufficiently matches one or more user's interests (e.g., greater than a match threshold), the server 102 may transmit the advertisement data as local advertisement content to the set top box 106. If, however, the local advertisement content module 306 determines that none of the subject areas of the advertisement data sufficiently match one or more user's interests, the local advertisement content module 306 may continue to search for local advertisement content. In various embodiments, the local advertisement content module 306 may determine that a subject area (e.g., "Used Vehicles") of advertisement data sufficiently matches one or more user's interests if a comparison of the subject area to the one or more user's interest results in match value that is greater than a match threshold (e.g., a fuzzy logic match threshold). In various embodiments, the match threshold may be determined by the implementers of the local advertisement system 100 based on one or more design preferences.

In various embodiments, advertisement data may be associated with one or more subject areas by the implementers of the local advertisement system 100. Accordingly, the local advertisement content module 306 may determine that one or more subject areas of the advertisement data sufficiently matches one or more user's interests by comparing the subject areas associated with advertisement data to one or more user interests.

In various embodiments, the local advertisement content module 306 may be configured to associate local advertisement content with linear content randomly. For example, the local advertisement content module 306 may associate an interactive local advertisement content banner that advertises the sale of a treadmill that is accessible within a local viewing area of a user with first linear content (e.g., an episode of "Law and Order"). In another example, the local advertisement content module 306 may associate an interactive local advertisement content icon that advertises legal services that are accessible within a local viewing area of a user with second linear content (e.g., an episode of "The Tudors").

In various embodiments, the local advertisement content module 306 may be configured to associate local advertisement content with linear content based on one or more user interests determined from the user profile data. For example, the local advertisement content module 306 may associate an interactive local advertisement content banner that advertises the sale of a treadmill that is accessible within a local viewing area of a user with first linear content (e.g., a broadcast of a Track and Field meet). In another example, the local advertisement content module 306 may associate an interactive local advertisement content icon that advertises legal services that are accessible within a local viewing area of a user with second linear content (e.g., an episode of "Law and Order"). Accordingly, the local advertisement content module 306 may transmit an indication of which local advertisement content is to be displayed with which linear content with the local advertisement content and/or the linear content.

FIG. 4 illustrates an exemplary screen shot of an local advertisement graphical user interface 400 in accordance with exemplary embodiments. The local advertisement graphical user interface 400 may permit the user to instruct the set top box 106 to retrieve and/or display local advertisement information and/or local advertisement content at the display device 108.

In an exemplary embodiment, the local advertisement graphical user interface 400 may be displayed in response to a user request to view the local advertisement graphical user interface 400. For example, the user may use an input device 112 (e.g., a remote control) to generate a local advertisement graphical user interface display request that requests the set top box 106 to cause display of the local advertisement graphical user interface 400 at the display device 108. In various embodiments, the user may press a button associated with the input device 112 (e.g., a "local content" button) and/or access a "local content" menu option in a menu guide to generate a local advertisement graphical user interface display request. When the local advertisement graphical user interface display request is received, the local advertisement output module 208 of the set top box 106 may generate and/or display the local advertisement graphical user interface 400.

In an exemplary embodiment, the local advertisement graphical user interface 400 may include one or more local advertisement menu options. For example, the local advertisement graphical user interface 400 may include "Wanted Items" information (e.g., a "Wanted Items" option), "Free Items" information (e.g., a "Free Items" option), "Coupons" information (e.g., a "Coupons" option), "Tickets" information (e.g., a "Tickets" option), "Automobiles" information (e.g., an "Automobiles" option), "Furniture" information (e.g., a "Furniture" option), and/or any other options that may be associated with receiving local advertisement content. The user may use the input device 112 to select one of the local advertisement menu option fields. In an exemplary embodiment, the local advertisement graphical user interface 400 may include an indicator (not shown) to identify which local advertisement menu option fields are selected, and the user may press an input key (e.g., "Enter") on the input device 112 to generate a select message requesting that the set top box 106 activate and/or display information associated with the selected local advertisement menu option. If, for example, the user selects an option field, the local advertisement output module 208 may output (e.g., display in video form, play in audio form) information and/or local advertisement content associated with the selected option field.

Figure 5:
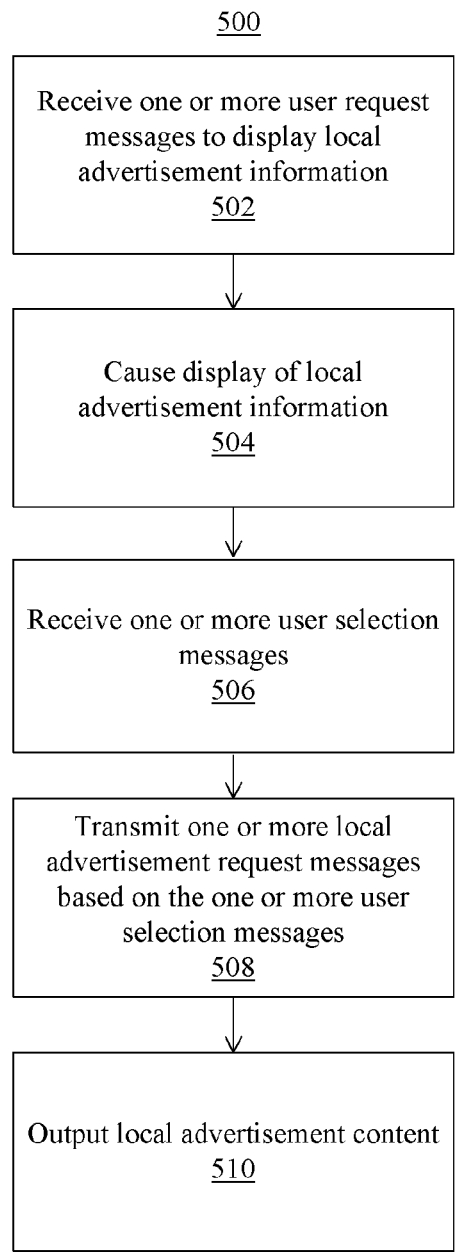
FIG. 5 illustrates a flow diagram of a method for providing localized advertisement information in accordance with exemplary embodiments.

FIG. 5 illustrates a flow diagram of a method 500 for providing localized advertisement information in accordance with exemplary embodiments. This exemplary method is provided by way of example, as there are a variety of ways to carry out methods disclosed herein. The method 500 shown in FIG. 5 can be executed or otherwise performed by one or a combination of various systems. The method 500 is described below as carried out by the set top box 106 of the local advertisement system 100 shown in FIG. 1 by way of example, and various elements of the local advertisement system 100 are referenced in explaining the example method 500 of FIG. 5. Each block shown in FIG. 5 represents one or more processes, methods, or subroutines carried in the exemplary method 500. Referring to FIG. 5, the exemplary method 500 may begin at block 502.

In block 502, the method 500 may include receiving one or more user request messages to display local advertisement information. In an exemplary embodiment, a communication module 202 of the set top box 106 and/or a local advertisement request module 204 of the set top box 106 may receive one or more user request messages to display local advertisement information. For example, a user may use an input device 112 to generate one or more user request messages. The method 500 may continue to block 504.

In block 504, the method 500 may include causing the display of local advertisement information. In an exemplary embodiment, the local advertisement output module 208 of the set top box 106 may output (e.g., display) local advertisement information in the form of one or more graphical user interfaces, such as, the local advertisement graphical user interface 400 illustrated in FIG. 4. In various embodiments, the local advertisement output module 208 may output the local advertisement information via the display device 108. The method 500 may continue to block 506.

In block 506, the method 500 may include receiving one or more user selection messages. In an exemplary embodiment, the communication module 202 and/or the local advertisement request module 204 may receive one or more user selection messages from the input device 112. For example, a user may use the input device 112 to generate one or more user selection messages. The method 500 may continue to block 508.

In block 508, the method 500 may include transmitting one or more local advertisement request messages based on the one or more user selection messages. In an exemplary embodiment, the local advertisement request module 204 may generate and/or transmit one or more local advertisement request messages to the server 102 via the network 104. In an exemplary embodiment, the communication module 202 may transmit one or more local advertisement request messages generated by the local advertisement request module 204 to the server 102 via the network 104. The method 500 may continue to block 510.

In block 510, the method 500 may include outputting local advertisement content. In an exemplary embodiment, the local advertisement output module 208 may output (e.g., display) the local advertisement content received from the server 102 using a display device 108. In various embodiments, the local advertisement output module 208 may output the local advertisement content in audio form, video form, and/or any other form decipherable by the user based on user inputs. The method 500 may then end.

Figure 6:
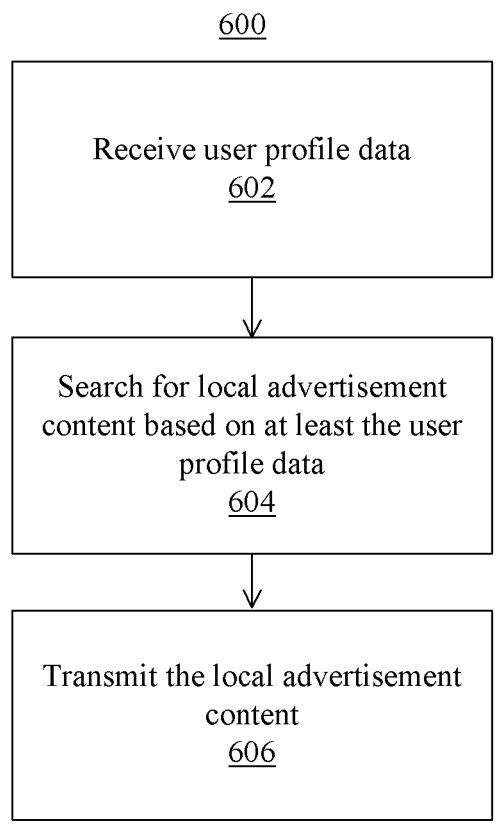
FIG. 6 illustrates a flow diagram of another method for providing localized advertisement information in accordance with exemplary embodiments.

FIG. 6 illustrates a flow diagram of another method 600 for providing localized advertisement information in accordance with exemplary embodiments. This exemplary method is provided by way of example, as there are a variety of ways to carry out methods disclosed herein. The method 600 shown in FIG. 6 can be executed or otherwise performed by one or a combination of various systems. The method 600 is described below as carried out by the server 102 of the local advertisement system 100 shown in FIG. 1 by way of example, and various elements of the local advertisement system 100 are referenced in explaining the example method 600 of FIG. 6. Each block shown in FIG. 6 represents one or more processes, methods, or subroutines carried in the exemplary method 600. Referring to FIG. 6, the exemplary method 600 may begin at block 602.

In block 602, the method 600 may include receiving user profile data. In an exemplary embodiment, a communication module 302 and/or a user profile module 308 may receive user profile data from one or more set top boxes 106 via the network 104. The method 600 may continue to block 604.

In block 604, the method 600 may include searching for local advertisement content based on at least the user profile data. In an exemplary embodiment, a local advertisement content module 306 may search for local advertisement content based on the user profile data by comparing the location information associated with the user profile data with the product location information associated with advertisement data. If, for example, the local advertisement content module 306 determines that the product location information of the advertisement data sufficiently matches the location information (e.g., within the local viewing area of the user), the local advertisement system 100 may transmit the advertisement data as local advertisement content to the set top box 106 in block 606. If, however, the local advertisement content module 306 determines that the product location information of the advertisement data does not sufficiently match the location information, the local advertisement content module 306 may continue to search for local advertisement content in block 604. The method 600 may continue to block 606.

In block 606, the method 600 may include transmitting local advertisement content. In an exemplary embodiment, the communication module 302 and/or the local advertisement content module 306 may transmit the local advertisement content to one or more set top boxes 106 via the network 104. In an exemplary embodiment, a display device 108 may output (e.g., display in video form, play in audio form) the local advertisement content to the user. The method 600 may then end.

In the preceding specification, various preferred embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:

receiving, at a server, user profile data associated with a set top box via a network, wherein the user profile data comprises user interest information and location information associated with a user and wherein the user interest information comprises information indicating a user's preferred day and time of advertisement, information based on a user's viewing habits related to advertising, information indicating the amount of time the user changes the channel from one or more advertisements, and information indicating the amount of time the user watches an advertisement to completion;

searching for local advertisement content by comparing at least the location information of the user profile data with location information associated with a plurality of advertisement content;

selecting local advertisement content based on the comparison and the user profile data;

associating the selected local advertisement content with linear content based on at least product location information of corresponding advertisement content and a subject area of the linear content; and transmitting, to the set to box, the selected local advertisement content and the linear content.

2. The method of claim 1, further comprising receiving, from one or more advertisement systems, advertisement content.

3. The method of claim 1, wherein the network comprises a passive optical network (PON).

4. A non-transitory computer readable media comprising code to perform the acts of the method of claim 1.

5. A system, comprising:

a user profile module for receiving, at a server, user profile data associated with a set top box via a network, wherein the user profile data comprises user interest information and location information associated with a user, and wherein the user interest information comprises information indicating a user's preferred day and time of advertisement, information based on a user's viewing habits related to advertising, information indicating the amount of time the user changes the channel from one or more advertisements, and information indicating the amount of time the user watches an advertisement to completion a local advertisement content module for searching for local advertisement content by comparing at least the location information of the user profile data with location information associated with a plurality of advertisement content, selecting local advertisement content based on at least the comparison and the user profile data, and associating the local advertisement content with linear content based on location information of corresponding advertisement content and a subject area of the linear content; and a communication module for transmitting, to the set to box, the selected local advertisement content and the linear content.

6. The system of claim 5, wherein the local advertisement module further receives, from one or more advertisement systems, advertisement content.

7. The system of claim 5, wherein the network comprises a passive optical network (PON).

8. The method of claim 1, wherein the user's viewing habits related to advertising is determined from an advertising log.

9. The method of claim 8, wherein the advertising log comprises at least one of advertisement data associated with the amount of advertisements a user has watched, the type of advertisements the user watches, the amount of time a user changes the channel from one or more advertisements, the amount of time a user watches an advertisement to completion, or any other advertisement data associated with identifying user preferences from the user's viewing habits related to advertisements.

10. The method of claim 1, wherein the user interest information further comprises a duration of time associated with a channel change, the name of a program changed to, and the name of a program changed from.

11. The method of claim 1, wherein the user interest information further comprises: television programs recorded, tagged favorite channels, tagged favorite programs, movies purchased, queries searched, and a series recording priority.

12. The method of claim 1, wherein selecting local advertisement content based on the comparison and the user profile data comprises:

further comparing the user interest information to at least one datum associated with the local advertisement content;

determining that the at least one datum associated with the local advertisement content results in a match value that is greater than a match threshold, wherein the match value is based on the user interest information; and selecting the local advertisement content based on the determination that the match value of the at least one datum associated with the local advertisement is greater than the match threshold.

13. The method of claim 12, wherein the match threshold is a fuzzy logic match threshold.

* * * * *